(12) United States Patent
Son et al.

(10) Patent No.: US 8,743,303 B2
(45) Date of Patent: Jun. 3, 2014

(54) LIQUID CRYSTAL DISPLAY DEVICE HAVING PARTICULAR OPTICAL MEMBER

(75) Inventors: Hyeon-Ho Son, Goyang-si (KR); Ju-Un Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 140 days.

(21) Appl. No.: 13/542,447

(22) Filed: Jul. 5, 2012

(65) Prior Publication Data
US 2013/0010218 A1  Jan. 10, 2013

(30) Foreign Application Priority Data
Jul. 7, 2011 (KR) .................... 10-2011-0067265

(51) Int. Cl.
*G02F 1/1335* (2006.01)

(52) U.S. Cl.
USPC .............................. 349/15; 349/117; 349/119

(58) Field of Classification Search
CPC .......... G02F 1/13363; G02F 1/133634; G02F 2202/40; G02B 27/2214; G02B 27/26; G02B 5/3083; H04N 13/0404
USPC ............................................ 349/15, 117, 119
See application file for complete search history.

(56) References Cited

U.S. PATENT DOCUMENTS

| | | | | |
|---|---|---|---|---|
| 6,128,059 | A * | 10/2000 | Nishiguchi | 349/129 |
| 8,520,176 | B2 * | 8/2013 | Lin et al. | 349/117 |
| 8,547,488 | B2 * | 10/2013 | Kim et al. | 349/15 |
| 2013/0044267 | A1 * | 2/2013 | Ishiguro et al. | 349/15 |

* cited by examiner

*Primary Examiner* — Mike Qi
(74) *Attorney, Agent, or Firm* — Brinks Gilson & Lione

(57) ABSTRACT

A liquid crystal display device displaying a three-dimensional image using a left-eye image and a right-eye image includes a liquid crystal panel including first and second substrates that are spaced apart from each other; a patterned retarder disposed over the liquid crystal panel; and an optical member disposed under the liquid crystal panel, wherein the optical member includes at least one inclined plane corresponding to each pixel region of the liquid crystal panel.

8 Claims, 10 Drawing Sheets

LIQUID CRYSTAL DISPLAY DEVICE HAVING PARTICULAR OPTICAL MEMBER

This application claims the priority and the benefit under 35 U.S.C. §119(a) on Korean Patent Application No. 10-2011-0067265, filed on Jul. 7, 2011, the entire contents of which are hereby incorporated by reference.

BACKGROUND

1. Field of the Invention

The disclosure relates to a liquid crystal display device, and more particularly, to a liquid crystal display device including a patterned retarder layer.

2. Discussion of the Related Art

Recently, with the rapid development of information technologies, various display devices for displaying images have been proposed. Liquid crystal display devices, which are able to display not only two-dimensional images but also three-dimensional images, have been developed.

Human beings perceive depth and a three-dimensional effect due to psychological and memorial factors in addition to a binocular disparity from a separation distance of eyes.

As one of the methods for displaying three-dimensional images using these factors, a stereoscopic type uses a physiological factor of both eyes to perceive the three-dimensional effect.

The stereoscopic type uses stereography in which, when two-dimensional linking images including parallax information are provided to left- and right-eyes spaced apart from each other with a distance of about 65 mm, the brain produces space information about the front and the rear of the screen during merging them and thus perceives the three-dimensional effect.

The stereoscopic type may be classified into a glasses type, where the user wears specific glasses, and a glasses-free type, where a parallax barrier or a lens array such as lenticular or integral is used at a display side, depending on a position in which a substantial three-dimensional effect is produced.

The glasses type has wider viewing angles and causes less dizziness than the glasses-free type. In addition, the glasses type can be manufactured with relatively low costs.

The glasses type may be classified into a shutter glasses-type and a polarization glasses-type.

In the shutter glasses-type, left- and right-eye images are alternately displayed in a screen, sequential opening and closing timing of a left shutter and a right-shutter of the shutter glasses is accorded with alternation time of the left- and right-eye images, and the respective images are separately perceived by the left eye and the right eye, thereby producing the three-dimensional effect.

In the shutter glasses-type, the alternation timing of the images may not be controlled to be completely accorded. Thus, flicker may occur, and this may cause fatigue such as dizziness while watching the images.

In the polarization glasses-type, pixels of a screen are divided into two parts by columns, rows or pixels, left- and right-eye images are displayed in different polarization directions, the left-glass and the right-glass of the polarization glasses have different polarization directions, and the respective images are separately perceived by the left eye and the right eye, thereby producing the three-dimensional effect.

The polarization glasses-type does not have factors of causing flicker, and fatigue is less caused while watching the images.

In addition, since the polarization glasses-type can use a polarization dividing optical means, which is patterned and is able to divide polarized light, such as a patterned retarder, for example, on a front surface of a display panel, the viewer can wear polarization glasses, which are very cheaper than the shutter glasses, to watch it. Accordingly, costs of the polarization glasses-type are relatively low.

Hereinafter, a polarization glasses-type liquid crystal display (LCD) device of the related art will be described with reference to accompanying drawings.

FIG. 1 is a cross-sectional view of schematically illustrating a polarization glasses-type LCD device according to the related art and explains a three dimensional (3D) crosstalk, FIG. 2 is a cross-sectional view of schematically illustrating a polarization glasses-type LCD device including a black stripe to remove a 3D crosstalk according to the related art.

In FIG. 1, the polarization glasses-type LCD device 1 according to the related art includes a first substrate 10, a second substrate 20 and a third substrate 50. Gate lines (not shown), data lines (not shown) and thin film transistors (not shown) are formed on the first substrate. The second substrate 20 includes left-eye horizontal pixel lines Hl, right-eye horizontal pixel lines Hr and black matrix BM. A patterned retarder 52 is formed on the third substrate 50 by applying reactive mesogen.

A liquid crystal panel 30 is formed by attaching the first substrate 10 and the second substrate 20 and produces images.

A first polarizer (not shown) is attached at a lower surface of the first substrate 10, and a second polarizer 40 is attached at an upper surface of the second substrate 20.

Here, the first polarizer (not shown) and the second polarizer 40 transmit linearly polarized light, which is parallel to respective transmission axes. The transmission axis of the first polarizer (not shown) is perpendicular to the transmission axis of the second polarizer 40.

The patterned retarder 52 is attached at an upper surface of second polarizer 40. The patterned retarder 52 includes left-eye retarders Rl and right-eye retarders Rr.

At up and down viewing angles of the polarization glasses-type LCD device, as shown in a portion A, some of the left-eye image Il' displayed by the left-eye horizontal pixel lines Hl passes through the right-eye retarder Rr of the patterned retarder 52 and is right-circularly polarized differently from front or left and right viewing angles.

Then, the some of the left-eye image Il' circularly polarized passes through the right-eye lens of the polarization glasses 70 together with the right-eye image Ir circularly polarized and is transmitted to the right-eye of the viewer.

Therefore, 3D crosstalk occurs due to the interference between the right-eye image Ir and the some of the left-eye image Il', and the up and down viewing angles in the 3D mode are decreased.

Here, the 3D crosstalk means that recognition of the clear 3D image is disturbed by providing the left-eye image Il to the right-eye or providing the right-eye image Ir to the left-eye. The resolution of the 3D image increases and tiredness of the eyes decreases as the 3D crosstalk gets small.

To prevent occurrence of the 3D crosstalk, as shown in FIG. 2, the polarization glasses-type liquid crystal display device 11 of the related art includes a black stripe BS over the patterned retarder 52. The black stripe BS is disposed between the left-eye retarder Rl and the right-eye retarder Rr.

The some of the left-eye image Il', which passes through the left-eye horizontal pixel line Hl of the liquid crystal panel 30 and goes into the right-eye retarder Rr of the patterned retarder, is blocked by the black stripe BS.

As a result, only the right-eye image Ir is circularly polarized and is transmitted to the right-eye of the viewer through the right-eye lens of the polarization glasses 70. The 3D crosstalk due to the interference between the right-eye image Ir and the some of the left-eye image Il' is prevented.

However, the non-display area of the liquid crystal panel 30 is increased due to the black stripe BS. The aperture ratio and the brightness are decreased.

In addition, the polarization glasses-type liquid crystal display device 1 or 11 uses a glass substrate for the third substrate 50 on which the patterned retarder 52 is formed.

The glass substrate has advantages of superior surface flatness, high transparency, and uniform optical properties without birefringence. Moreover, an alignment layer or reactive mesogens can be formed on the glass substrate with a uniform thickness by a spin coating method.

On the other hand, the glass substrate is expensive, is fragile during processes and causes low yields and productivity due to long manufacturing time.

BRIEF SUMMARY

A liquid crystal display device displaying a three-dimensional image using a left-eye image and a right-eye image includes a liquid crystal panel including first and second substrates that are spaced apart from each other; a patterned retarder disposed over the liquid crystal panel; and an optical member disposed under the liquid crystal panel, wherein the optical member includes at least one inclined plane corresponding to each pixel region of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail to exemplary embodiments of the invention, which are illustrated in the accompanying drawings.

Figure 3:
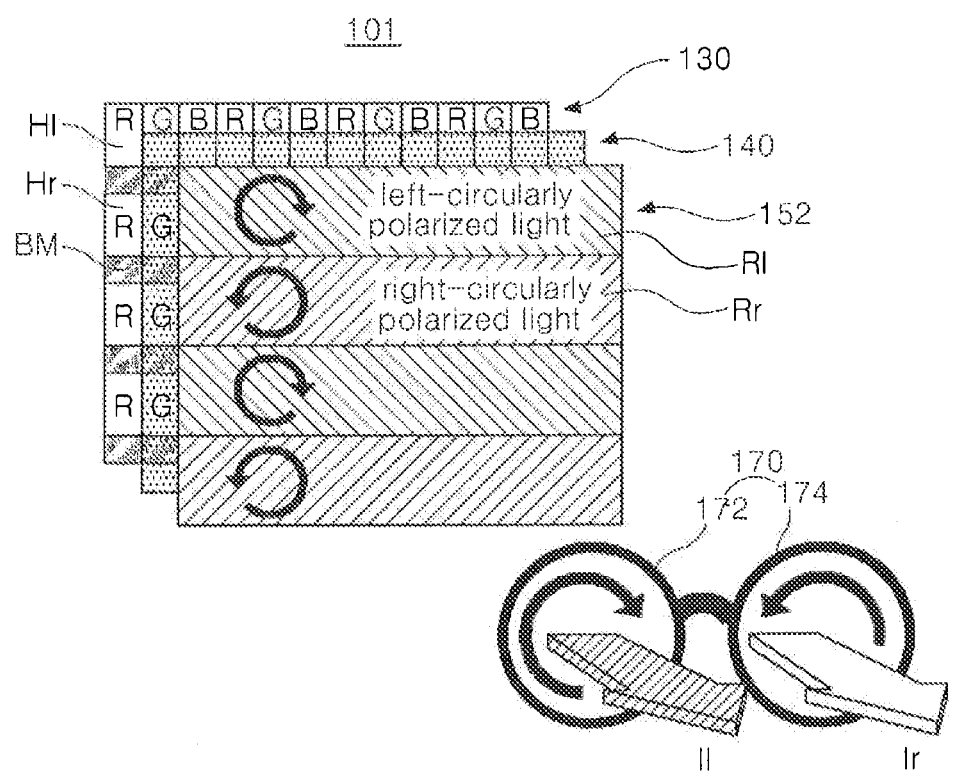
FIG. 3 is a perspective view of illustrating a polarization glasses-type liquid crystal display device according to a first embodiment of the present invention.
Figure 4:
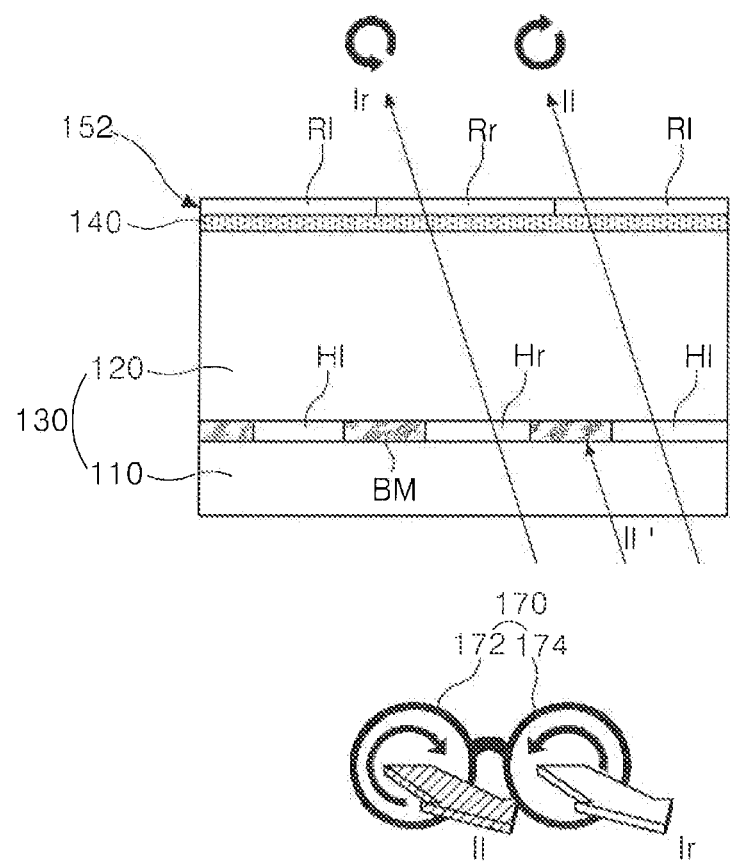
FIG. 4 is a cross-sectional view of schematically illustrating the polarization glasses-type liquid crystal display device according to the first embodiment of the present invention.

FIG. 3 is a perspective view of illustrating a polarization glasses-type liquid crystal display device according to a first embodiment of the present invention, and FIG. 4 is a cross-sectional view of schematically illustrating the polarization glasses-type liquid crystal display device according to the first embodiment of the present invention.

In FIG. 3 and FIG. 4, the polarization glasses-type liquid crystal display device 101 according to the first embodiment of the present invention includes a liquid crystal panel 130 composed of first and second substrates 110 and 120 facing and spaced apart from each other, a first polarizer (not shown) and a second polarizer 140 at outer surfaces of the first and second substrates 110 and 120, a backlight unit (not shown) under the first polarizer (not shown), and a patterned retarder 152 over the second polarizer 140.

The liquid crystal panel 130 is formed by attaching the first and second substrates 110 and 120. The liquid crystal panel 130 includes left-eye horizontal pixel lines Hl displaying a left-eye image Il and right-eye horizontal pixel lines Hr displaying a right-eye image Ir.

The left-eye horizontal pixel lines Hl and the right-eye horizontal pixel lines Hr are alternately arranged along a vertical direction of the liquid crystal panel 130 in the context of the figure. Red, green and blue sub-pixels R, G and B are sequentially arranged in each of the left-eye horizontal pixel lines Hl and the right-eye horizontal pixel lines Hr.

Here, although not shown in the figures, gate lines (not shown) and data lines (not shown) are formed on the first substrate 110 and cross each other to define pixel regions (not shown). Thin film transistors (not shown) are connected to the gate lines and the data lines. Pixel electrodes (not shown) are connected to respective thin film transistors and are disposed in the pixel regions (not shown), respectively.

Red, green and blue color filters (not shown) and a black matrix BM are formed on the second substrate 120.

Light from the backlight unit (not shown) are linearly polarized while passing through the first polarizer, the liquid crystal panel 130 and the second polarizer 140 and enters the patterned retarder 152.

The patterned retarder 152 includes left-eye retarders Rl and right-eye retarders Rr. The left-eye retarders Rl and the right-eye retarders Rr correspond to the left-eye horizontal pixel lines Hl and the right-eye horizontal pixel lines Hr of the liquid crystal panel 130, respectively.

The left-eye image Il and the right-eye image Ir transmitted from the liquid crystal panel 130 are changed into a linearly polarized left-eye image Il and a linearly polarized right-eye image Ir through the second polarizer 140, and the linearly polarized left-eye image Il and the linearly polarized right-eye image Ir go into the patterned retarder 152.

The linearly polarized left-eye image Il and the linearly polarized right-eye image Ir passing through the patterned retarder 152 are circularly polarized.

Namely, the linearly polarized left-eye image Il passing through the left-eye retarder Rl is changed into left-circularly polarized light and transmitted, and the linearly polarized right-eye image Ir passing through the right-eye retarder Rr is changed into right-circularly polarized light and transmitted.

The left-eye image Il displayed by the left-eye horizontal pixel lines Hl of the liquid crystal panel 130 is linearly polarized by the second polarizer 140, is left-circularly polarized by the left-eye retarder Rl of the patterned retarder 152, and is transmitted.

The right-eye image Ir displayed by the right-eye horizontal pixel lines Hr of the liquid crystal panel 130 is linearly polarized by the second polarizer 140, is right-circularly polarized by the right-eye retarder Rr of the patterned retarder 152, and is transmitted.

The left-circularly polarized left-eye image Il and right-circularly polarized right-eye image Ir are transmitted to a viewer.

Polarization glasses 170 which the viewer wears include a left-eye lens 172 and a right-eye lens 174. The left-eye lens 172 transmits only left-circularly polarized light, and the right-eye lens 174 transmits only right-circularly polarized light.

Accordingly, among the images transmitted to the viewer, the left-circularly polarized left-eye image Il is transmitted to the left-eye of the viewer through the left-eye lens 172, and the right-circularly polarized right-eye image Ir is transmitted to the right-eye of the viewer through the right-eye lens 174.

The viewer combines the left-eye image Il and the right-eye image Ir respectively transmitted to the left-eye and the right-eye and realizes a three-dimensional stereoscopic image.

The patterned retarder 152, which is used as a polarization-dividing optical means, is disposed at a front side of the liquid crystal display device and changes the left-eye image Il and the right-eye image Ir from the liquid crystal panel 130 such that the left-eye image Il and the right-eye image Ir have different polarization directions.

The patterned retarder has been formed by applying reactive mesogens onto a glass substrate, aligning the reactive mesogens to have different polarization axes, and cross-linking the reactive mesogens using light.

However, the glass substrate is expensive, is fragile during manufacturing processes and needs long manufacturing time. Thus, there are problems of low yields and productivity.

Therefore, the polarization glasses-type liquid crystal display device 101 according to the first embodiment of the present invention includes a film patterned retarder which is formed using a film substrate instead of the glass substrate.

In the polarization glasses-type liquid crystal display device 101 according to the first embodiment of the present invention, the left-eye retarders Rl and the right-eye retarders Rr of the patterned retarder 152 are matched with the horizontal pixel lines Hl and Hr one-to-one such that the left-eye image Il from the liquid crystal panel 130 is transmitted through the left-eye horizontal pixel lines Hl and the left-eye retarder Rl and the right-eye image Ir from the liquid crystal panel 130 is transmitted through the right-eye horizontal pixel lines Hr and the right-eye retarder Rr.

Here, at up and down viewing angles, any one-eye image may enter the unintended patterned retarder 152 and may be differently polarized.

The polarized image enters the opposite lens of the glasses and causes 3D crosstalk. The crosstalk increases according to viewing angles, and 3D viewing angles decrease.

For example, at front or left and right viewing angles, the linearly polarized left-eye image Il from the left-eye horizontal pixel line Hl enters the left-eye retarder Rl matched one-to-one and is left-circularly polarized as intended.

However, at the up and down viewing angles, the linearly polarized left-eye image Il from the left-eye horizontal pixel line Hl may enter the right-eye retarder Rr and may be right-circularly polarized.

Figure 1:
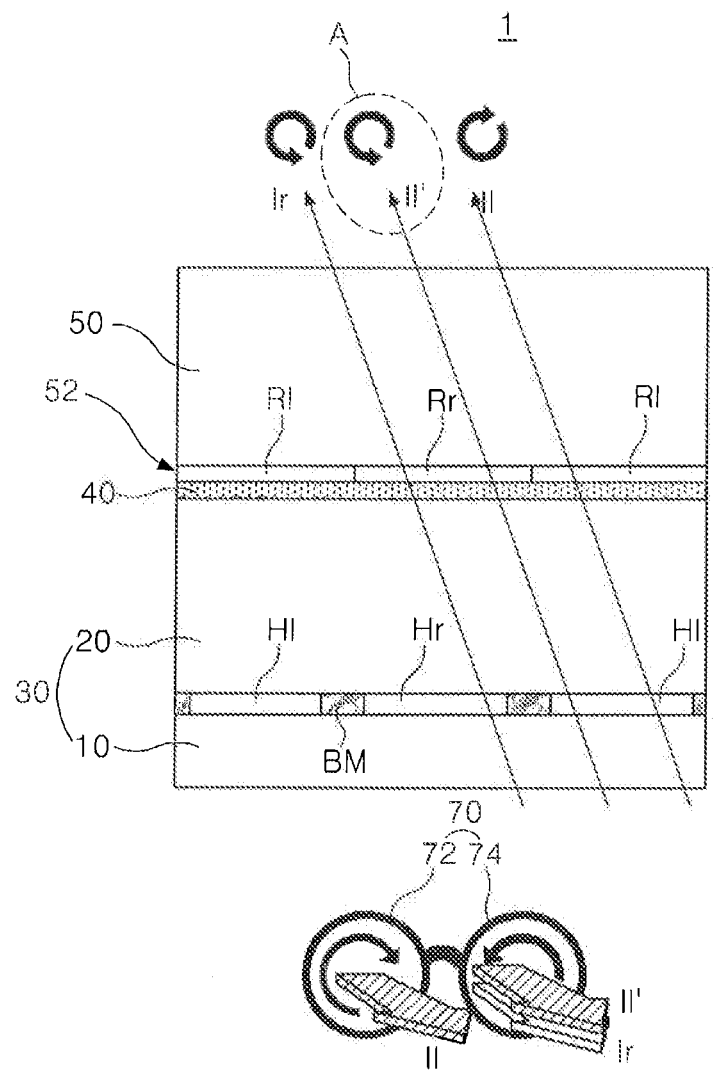
FIG. 1 is a cross-sectional view of schematically illustrating a polarization glasses-type LCD device according to the related art and explains a 3D crosstalk.
Figure 2:
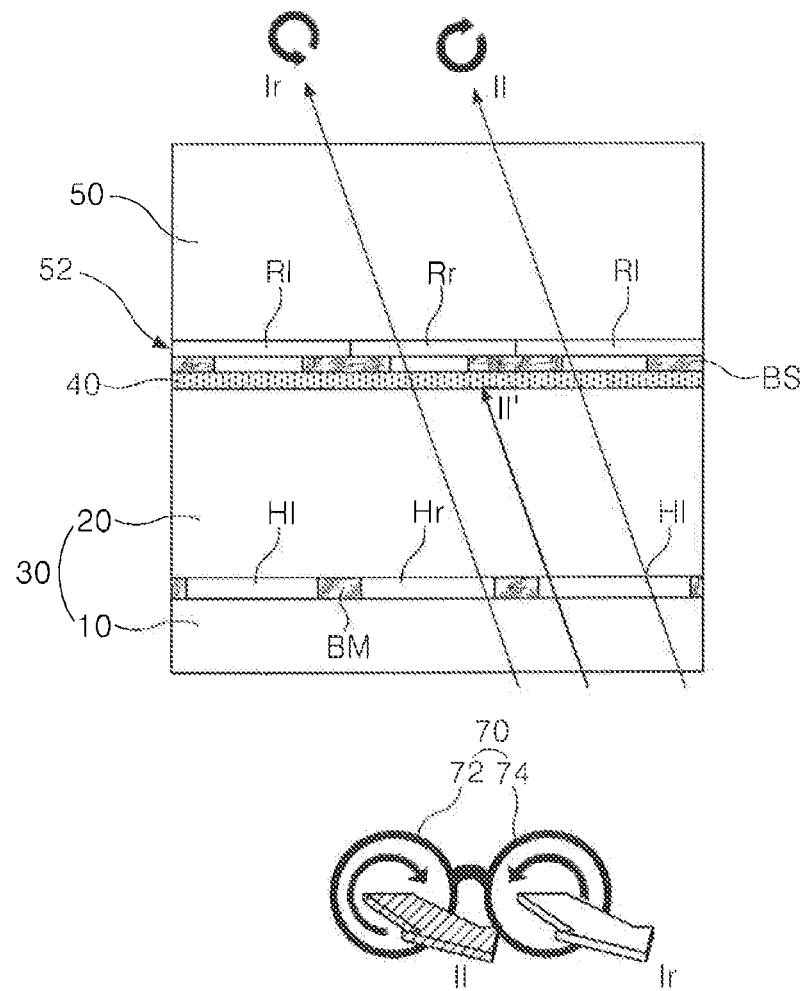
FIG. 2 is a cross-sectional view of schematically illustrating a polarization glasses-type LCD device including a black stripe to remove a 3D crosstalk according to the related art.

As a result, the 3D crosstalk may be generated due to interference between the right-eye image Ir and some left-eye image Il' of FIG. 1.

To prevent the 3D crosstalk, as shown in FIG. 4, the black matrix BM has a widened width in the polarization glasses-type liquid crystal display device 101 according to the first embodiment of the present invention.

Therefore, the some left-eye image Il' of FIG. 1 from the left-eye horizontal pixel line Hl is blocked by black matrix BM and does not enter the right-eye retarder Rr of the patterned retarder 152.

Like this, the 3D crosstalk can be prevented by increasing the width of the black matrix BM.

However, there is a problem of decreases in an aperture ratio and brightness because a non-display area of the liquid crystal panel 130 increases. The relation between an incidence angle and a refraction angle of an image will be described prior to a second embodiment improving the problem.

Figure 5:
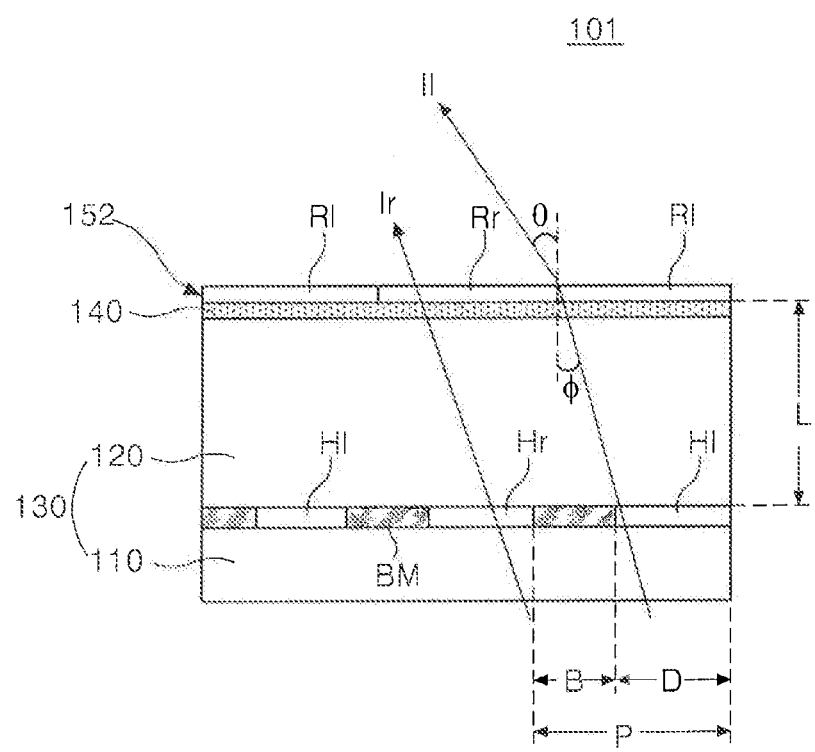
FIG. 5 is a view for explaining the relation between the incidence angle and the refraction angle of an image in the patterned retarder.
Figure 6:
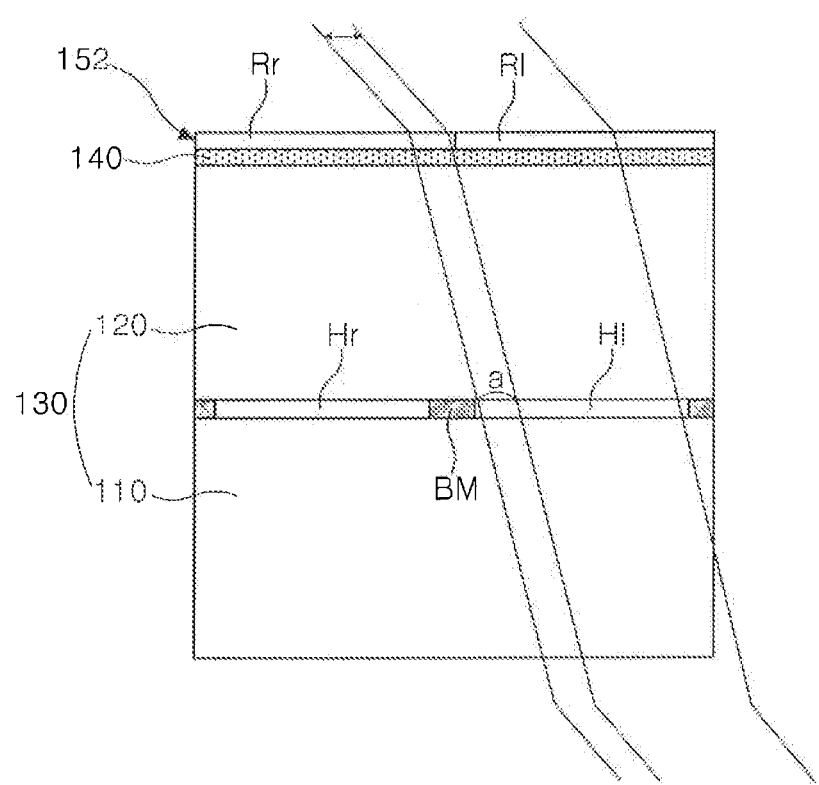
FIG. 6 is a view for explaining a change in a width of the black matrix depending on a 3D crosstalk region.

FIG. 5 is a view for explaining the relation between the incidence angle and the refraction angle of an image in the patterned retarder, and FIG. 6 is a view for explaining a change in a width of the black matrix depending on a 3D crosstalk region.

In FIG. 5, the left-eye image Il from the left-eye horizontal pixel line Hl is refracted while passing the second substrate 120 and the patterned retarder 152 having different refractive indexes.

Here, an up and down viewing angle θ is a critical angle at which the crosstalk does not occur (substantially, an angle at which the crosstalk is 7%) and can be obtained through equation 1 to equation 3.

Equation 1 shows a geometric condition in a medium. The medium may be the second substrate 120 and the second polarizer 140.

$$d \cdot CT_{ref} + \frac{B}{2} = L\tan\phi \quad \text{[equation 1]}$$

Here, CTref is a permissible maximum crosstalk value (standard crosstalk value), d is a length of the horizontal pixel line, B is a width of black matrix, L is a distance from the second substrate 120 to the patterned retarder 152 (that is, the sum of a thickness of the second substrate 120 and a thickness of the second polarizer 140), and n is an average refractive index of the second substrate 120 and the second polarizer 140.

At this time, the relation between φ and θ can be shown by equation 2 of Snell's Law.

Here, φ is an incidence angle of an image incident on the patterned retarder 152, and θ is a refraction angle of the image refracted through the patterned retarder 152 and means an up and down viewing angle.

$$n \sin\phi = \sin\theta \quad \text{[equation 2]}$$

Meanwhile, θ can be obtained from equation 3 derived from equation 1 and equation 2.

$$\theta = \sin^{-1}\left\{n\sin\left(\tan^{-1}\left(\frac{(P-B)CT_{ref} + \frac{B}{2}}{L}\right)\right)\right\} \quad \text{[equation 3]}$$

For example, in a 47-inch FHD panel, when P is 540 micrometers, B is 240 micrometers, L is 900 and n is 1.5, the up and down viewing angle θ may be 13.4 degrees with respect to 7% crosstalk CTref.

The up and down viewing angle can be improved by increasing the value B or decreasing the value L.

However, it is hard to control the L value, which is the distance from the second substrate 120 and the patterned retarder 152, in the current process. Thus, in the first embodiment, the up and down viewing angle is improved by increasing the value B, which is the width of the black matrix BM.

In the first embodiment of FIG. 6, the crosstalk can occur when the linearly polarized left-eye image Il from the left-eye horizontal pixel line Hl in a region "a" enters the right-eye retarder Rr adjacent to the left-eye retarder Rl.

Therefore, the crosstalk can be removed by increasing the width of the black matrix BM by the width of the region "a" left and right.

However, when the value B increases, light transmittance is lowered in 2D and 3D modes, and the aperture ratio is decreased.

Accordingly, hereinafter, a method of improving the up and down viewing angles will be described by preventing the 3D crosstalk without the increase of the value B.

Figure 7:
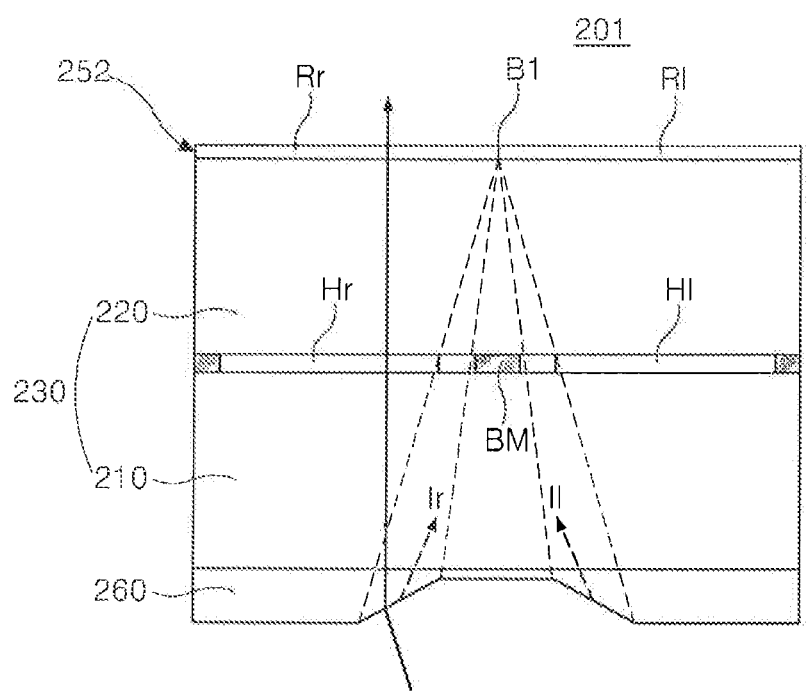
FIG. 7 is a cross-sectional view of schematically illustrating a polarization glasses-type liquid crystal display device according to a second embodiment of the present invention.

FIG. 7 is a cross-sectional view of schematically illustrating a polarization glasses-type liquid crystal display device according to a second embodiment of the present invention.

In FIG. 7, the polarization glasses-type liquid crystal display device 201 according to the second embodiment of the present invention includes a liquid crystal panel 230 composed of first and second substrates 210 and 220 facing and spaced apart from each other, a first polarizer (not shown) and a second polarizer (not shown) at outer surfaces of the first and second substrates 210 and 220, a backlight unit (not shown) under the first polarizer (not shown), and a patterned retarder 252 over the second polarizer (not shown).

The liquid crystal panel 230 is formed by attaching the first and second substrates 210 and 220. The liquid crystal panel 230 includes left-eye horizontal pixel lines Hl displaying a left-eye image Il and right-eye horizontal pixel lines Hr displaying a right-eye image Ir.

The left-eye horizontal pixel lines Hl and the right-eye horizontal pixel lines Hr are alternately arranged along a vertical direction of the liquid crystal panel 230 in the context of the figure. Red, green and blue sub-pixels R, G and B are sequentially arranged in each of the left-eye horizontal pixel lines Hl and the right-eye horizontal pixel lines Hr.

Here, although not shown in the figures, gate lines (not shown) and data lines (not shown) are formed on the first substrate 210 and cross each other to define pixel regions (not shown). Thin film transistors (not shown) are connected to the gate lines and the data lines. Pixel electrodes (not shown) are connected to respective thin film transistors and are disposed in the pixel regions (not shown), respectively.

Red, green and blue color filters (not shown) and a black matrix BM are formed on the second substrate 220.

Light from the backlight unit (not shown) is linearly polarized while passing through the liquid crystal panel 230 and enters the patterned retarder 252.

There, the patterned retarder 252 includes left-eye retarders Rl and right-eye retarders Rr. The left-eye retarders Rl and the right-eye retarders Rr correspond to the left-eye horizontal pixel lines Hl and the right-eye horizontal pixel lines Hr of the liquid crystal panel 230, respectively.

The left-eye image Il and the right-eye image Ir transmitted from the liquid crystal panel 230 are changed into a linearly polarized left-eye image Il and a linearly polarized right-eye image Ir through the second polarizer, and the linearly polarized left-eye image Il and the linearly polarized right-eye image Ir go into the patterned retarder 252.

The linearly polarized left-eye image Il and the linearly polarized right-eye image Ir passing through the patterned retarder 252 are circularly polarized.

Namely, the linearly polarized left-eye image Il passing through the left-eye retarder Rl is changed into left-circularly polarized light and transmitted, and the linearly polarized right-eye image Ir passing through the right-eye retarder Rr is changed into right-circularly polarized light and transmitted.

The left-eye image Il displayed by the left-eye horizontal pixel lines Hl of the liquid crystal panel 230 is linearly polarized by the second polarizer, is left-circularly polarized by the left-eye retarder Rl of the patterned retarder 252, and is transmitted.

The right-eye image Ir displayed by the right-eye horizontal pixel lines Hr of the liquid crystal panel 230 is linearly polarized by the second polarizer, is right-circularly polarized by the right-eye retarder Rr of the patterned retarder 252, and is transmitted.

In the meantime, an optical member 260 is disposed under the first polarizer (not shown). The optical member 260 changes the path of light passing through the left-eye horizontal pixel line Hl such that among light from the backlight unit, the light passing through the left-eye horizontal pixel line Hl passes through only the left-eye retarder Rl.

Here, the optical member 260 may have a refractive index between the refractive index of air, n=1, and a refractive index of glass, n=1.5. It is beneficial that the refractive index of the optical member 260 is similar to the refractive index of glass.

The optical member 260 may have a prism or lens shape, for example.

In addition, the optical member 260 may be designed such that light incident on a specific region (the region "a" of FIG. 6) from the backlight unit is refracted into a predetermined direction (facing the point B1).

At this time, the optical member 260 may include two inclined planes and a horizontal plane corresponding to each pixel region of the liquid crystal panel. Light incident on the optical member 260 may be refracted by a refractive index determined by Snell's law.

Generally, when comparing refractive indexes of different mediums, the medium having the high refractive index may be referred to as a dense medium, and the medium having the low refractive index may be referred to as a rare medium.

If light is incident on the dense medium from the rare medium, the refraction angle is smaller than the incidence angle. If light is incident on the rare medium from the dense medium, the refraction angle is larger than the incidence angle.

As stated above, in case that light from the backlight unit passes through the optical member 260, the light is incident on the dense medium from the rare medium because the light is incident on the optical member 260 (n=1.5) from the air (n=1).

Therefore, the refraction angle "r" in the optical member 260 is smaller than the incidence angle "r" (i>r), and the light can be refracted to the predetermined direction (facing the point B1).

That is, in the liquid crystal display device 201 according to the second embodiment of the present invention, some left-eye image Il' of FIG. 1 from the left-eye horizontal pixel line Hl is refracted by the optical member 260 and does not go into the right-eye retarder Rr of the patterned retarder 152.

As a result, in the liquid crystal display device 201 according to the second embodiment of the present invention, the 3D crosstalk can be prevented without an increase in the width of the black matrix BM, and the up and down viewing angle can be improved.

The up and down viewing angle, for example, may be about 22 degrees due to the optical member while the up and down viewing angle is about 10 degrees in the related art.

Figure 8:
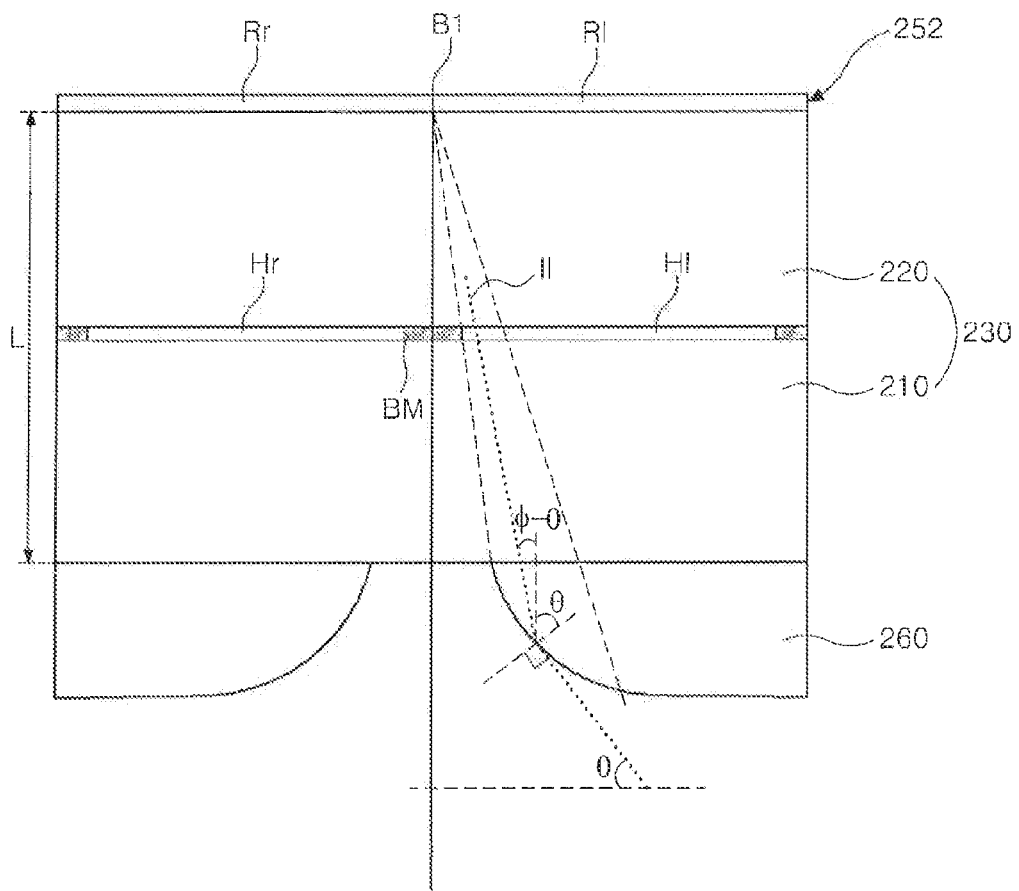
FIG. 8 and FIG. 9 are views for designing an optical member according to the second embodiment of the present invention.
Figure 9:
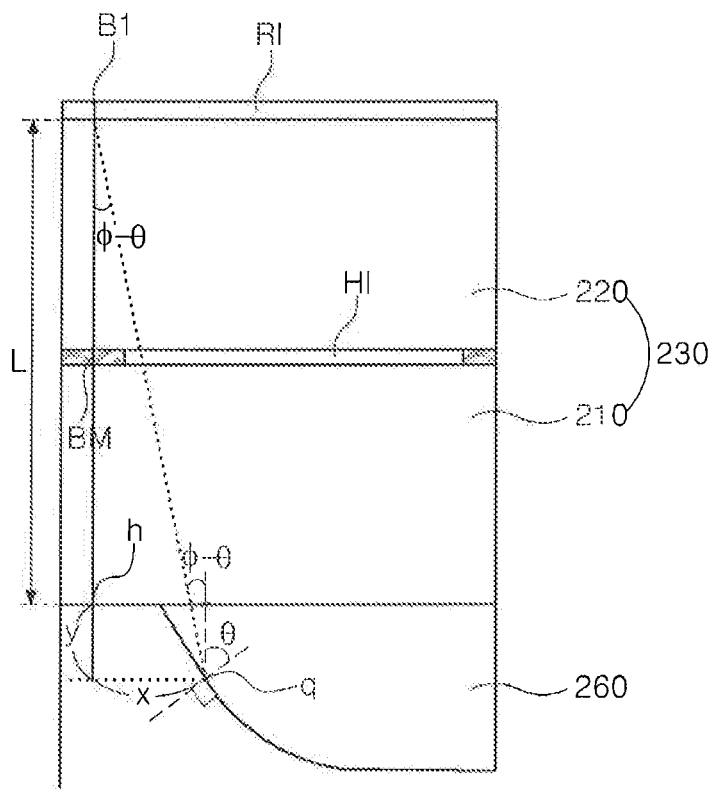

FIG. 8 and FIG. 9 are views for designing an optical member according to the second embodiment of the present invention.

The optical member in the polarization glasses-type liquid crystal display device according to the second embodiment of the present invention may be designed such that light incident on any point of the inclined plane of the optical member heads for the point B1.

As shown in the figures, light II incident on an point q(x, y) of the inclined plane of the optical member 260 may be refracted with the refraction angle φ when the incidence angle is 90 degrees with respect to the tangent at the point q.

At this time, x is a horizontal length from a pint h to the point q(x, y), and y is a vertical length from the point h to the point q(x, y).

Here, the point h is the point of contact between the first substrate 210 and the normal line to the first substrate 210 from the point B1.

And, θ is an angle between the tangent at the point q and the surface of the first substrate 210 and can be obtained by equation 4.

$$\frac{\Delta y}{\Delta x} = \tan\theta \qquad \text{[equation 4]}$$

The x and y values of the point q(x, y) can be obtained from the law of refraction of light and geometric conditions as shown in equation 5.

$$\sin^{-1}\left(\frac{1}{n}\right) - \theta = \tan^{-1}\left(\frac{x}{L+y}\right) \qquad \text{[equation 5]}$$

Here, n and 1 are the refractive indexes of the optical member and the air, respectively, and L is a length of the liquid crystal panel 230 along a thickness direction.

In equation 5, the left side is the refraction angle φ minus the angle θ at the point q(x, y) using Snell's Law, that is, φ−θ.

Additionally, the right side of equation 5 is an angle of the vertex at the point B1 of a right triangle having two sides of L+y and x, that is, φ−θ.

Therefore, the angle of the left side of equation 5 equals to the angle of the right side of equation 6 as the alternate angles of two parallel lines.

In the polarization glasses-type liquid crystal display device according to the second embodiment of the present invention, the inclined plane of the optical member 260 may be designed by properly adjusting the x and y values using equation 5 such that light refracted through the optical member 260 heads for the point B1.

Figure 10:
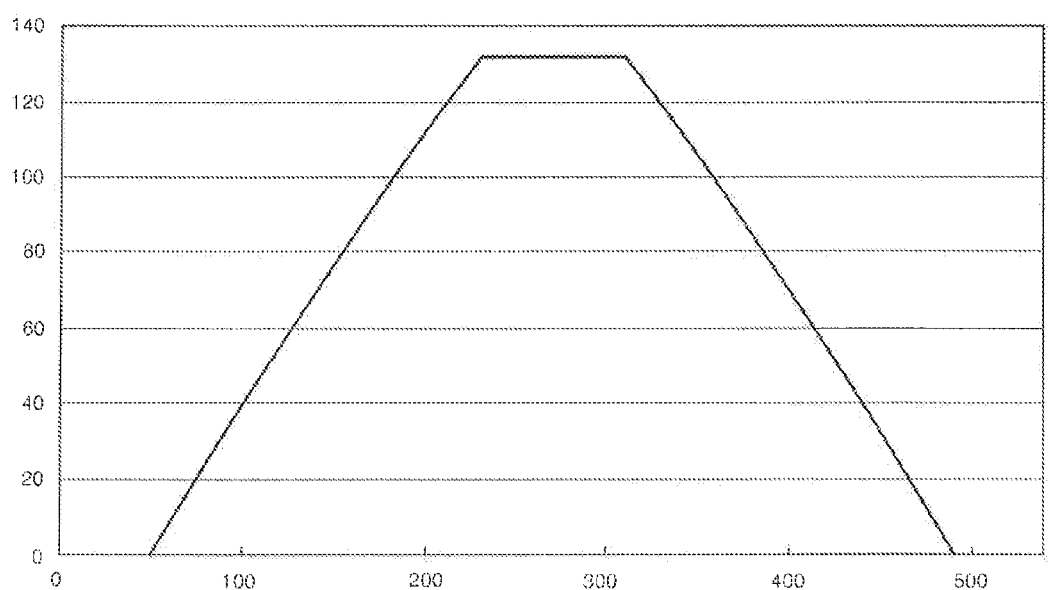
FIG. 10 is a view of schematically illustrating an optical member according to the second embodiment of the present invention.

FIG. 10 is a view of schematically illustrating an optical member according to the second embodiment of the present invention.

As shown in FIG. 10, in the polarization glasses-type liquid crystal display device 201 of FIG. 7 according to the second embodiment of the present invention, the optical member 260 of FIG. 9 has two inclined planes including the point q(x, y) and a horizontal plane corresponding to each pixel region.

The optical member 260 of FIG. 9 may have a trapezoid-like shape. The inclined planes may be curved.

The liquid crystal display device including the optical member 260 of FIG. 9 has the improved up and down viewing angles and relatively high brightness due to the decreased width of the black matrix as compared with the related art.

As stated above, the liquid crystal display device of the present invention includes an optical member under the liquid crystal panel, and the 3D crosstalk can be prevented from occurring. Accordingly, the up and down viewing angles can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A liquid crystal display device displaying a three-dimensional image using a left-eye image and a right-eye image, comprising:
    a liquid crystal panel having a plurality of pixel regions and including first and second substrates that are spaced apart from each other;
    a patterned retarder disposed over the liquid crystal panel; and
    an optical member disposed under the liquid crystal panel, wherein the optical member includes at least one inclined plane corresponding to each pixel region of the liquid crystal panel.

2. The device according to claim 1, wherein the optical member includes two inclined planes and a horizontal plane corresponding to each pixel region of the liquid crystal panel.

3. The device according to claim 1, wherein a point (x, y) on the at least one inclined plane is defined by a following equation:

$$\sin^{-1}\left(\frac{1}{n}\right) - \theta = \tan^{-1}\left(\frac{x}{L+y}\right),$$

wherein a refractive index of the optical member is n, a refractive index of air is 1, and L is a length of the liquid crystal panel along a thickness direction.

4. The device according to claim 1, wherein a refractive index of the optical member has a value between an refractive index of air and a refractive index of glass.

5. The device according to claim 1, wherein the liquid crystal panel includes left-eye horizontal lines displaying the left-eye image and right-eye horizontal lines displaying the right-eye image.

6. The device according to claim 5, wherein the patterned retarder includes left-eye retarders and right-eye retarders, wherein the left-eye retarders correspond to the left-eye horizontal pixel lines and change linearly polarized light into left-circularly polarized light, and the right-eye retarders correspond to the right-eye horizontal pixel lines and change linearly polarized light into right-circularly polarized light.

7. The device according to claim 1, wherein the liquid crystal panel includes a black matrix corresponding to a non-display region.

8. The device according to claim 1, wherein first and second polarizers are disposed at outer surfaces of the liquid crystal panel and selectively transmit light.

* * * * *